UNITED STATES PATENT OFFICE.

ADOLF VOGT, OF WESTMINSTER, ENGLAND, ASSIGNOR TO ELECTRIC RESISTANCE & HEATING COMPANY, LIMITED, OF LONDON, ENGLAND.

MANUFACTURE OF ELECTRICAL HEATING APPLIANCES.

SPECIFICATION forming part of Letters Patent No. 669,130, dated March 5, 1901.

Application filed May 23, 1900. Serial No. 17,757. (No model.)

*To all whom it may concern:*

Be it known that I, ADOLF VOGT, engineer, a citizen of Germany, residing at 82 Victoria street, Westminster, in the county of Middlesex, England, have invented a certain new and useful Improved Manufacture of Electrical Heating Appliances of High Electrical Resistance Capable of Sustaining High Temperatures, (for which I have made application for patent in Great Britain, dated November 7, 1899, No. 22,271,) of which the following is a specification.

This invention relates to a manufacture of electric heating appliances of high electrical resistance which shall be capable of producing and sustaining very high temperatures during long-continued use and which are mainly composed of a mixture of a non-conducting substance and a metal conductor. As non-conductor there may be used for this purpose kaolin, alumina, talc, quartz, and the like, also all very difficultly reducible or fusible metallic oxids, such as aluminium oxid and the so-called "rare earths," the essential characteristic of the material employed, or of some part thereof, being that when heated to a high degree it shall become fritted, slagged, or more or less vitrified, so as to form a hard dense body. The metals employed as the conducting material are nickel, cobalt, wolfram, and the like. For forming the heating bodies of a mixture of such materials it is indispensably necessary to first reduce them to an exceedingly fine state of subdivision and then to mix them intimately together and form the mixture into a paste or dough by the addition of water or other liquid. From this dough, which can be worked like potters' clay, the heating bodies can be molded of any desired configuration or the plastic compound can be pressed in molds, such pressure being only effected in order to insure perfectly uniform dimensions when the heating bodies are to be manufactured on a large scale. After molding, the heating bodies are dried, and they are then heated in an atmosphere of hydrogen gas, at first only to such a temperature that the more or less oxidized metal particles shall be completely reduced. For example, when nickel is used as the metal the temperature would be about 400° centigrade. When such reduction of the more or less oxidized metal has been completely effected by this means, (such oxidation will mainly occur on the surface of the particles,) the mass while still surrounded by hydrogen gas is heated to so high a degree that it becomes fritted or slagged—that is to say, more or less vitrified—forming a dense, hard body. The temperature employed should about equal the welding heat of the metal constituent, but should not exceed this.

In the above process special care has to be taken that the metal is kept as free as possible from contact with carbon, as otherwise the bodies produced when subject to frequent use are liable to become of increased resistance, the metal becoming brittle and of reduced conducting power.

The subjecting the resistance bodies first to a comparatively low temperature in an atmosphere of hydrogen and then to a high temperature while still surrounded by hydrogen instead of subjecting them at once to a high temperature while surrounded by carbon-powder, as was heretofore done, constitutes the essential and important feature of the present invention, inasmuch as the metal employed being unavoidably more or less oxidized it is necessary to effect its complete reduction by means of the hydrogen gas before the non-conducting constituent has been made to assume the dense fritted or vitrified condition by the application of a high heat, as if the still-oxidized particles become reduced, and consequently shrink in volume, after the non-conducting constituent has assumed the said hard condition this can no longer shrink to a corresponding extent, and as a consequence the metal particles would not be in such relative positions in the mass as would enable them to afford the requisite conducting power for giving the body the exact degree of resistance required—that is to say, the resistance would be too high and unreliable, and consequently the body practically useless.

By means of the above-described process, which only relates to the use of metals as the conductor in the heating body, the above-mentioned disadvantages of the existing manufactures of such bodies are entirely obviated and an essentially improved product is obtained.

This results, as above stated, essentially in first subjecting the compound, while surrounded by an atmosphere of hydrogen, to only such a comparatively low temperature as is sufficient to reduce all the oxidized metallic particles thereof to the metallic condition and in then raising the body to such a high temperature that the non-conducting constituents of the body while being burned or baked are caused to shrink and assume a dense fritted or more or less vitrified condition. By this process alone is it possible to produce electrical heating bodies that shall have and maintain for a long time the desired degree of resistance, and consequently of heating power.

Electrical heating bodies manufactured according to the above-described invention are particularly applicable with advantage for effecting the preliminary heating of second-class conductors, also for lighting cigars and pipes, for heating branding-dies, and a variety of similar purposes.

It is not intended to claim generally either the use of hydrogen gas as the reducing-gas in the manufacture of electrical resistance bodies nor the use of nickel as the metallic constituent of such bodies, as I am aware that these have been proposed separately in the manufacture of glow-lamp filaments and the like, but not in combination and in the manner herein described.

Having thus described the nature of this invention and the best means I know for carrying the same into practical effect, I claim—

1. Process for the manufacture of electrical heating appliances capable of sustaining high temperatures for a long time, which consists in first subjecting a compound composed of a mixture of a finely-divided metal such as nickel and a non-conducting material such as kaolin, or equivalent material, to only such a temperature in a reducing atmosphere as to cause all the oxidized metal particles to be reduced thereby to the metallic state, and then heating the compound to about the welding temperature of the metal, whereby the non-conducting particles of the compound are caused to assume a fritted or more or less vitreous hard, dense condition, the reducing agent employed for this purpose being hydrogen, under careful avoidance of carbon, substantially as and for the purposes described.

2. In the manufacture of electrical heating resistances the process, which consists in compounding a salt of a conductive metal with a refractory non-conductive material having the property of becoming fritted, slagged or more or less vitrified, reducing said salt to a metallic state in a reducing atmosphere, then subjecting the compound to a temperature sufficiently high to frit, slag or vitrify the refractory material, for the purpose set forth.

3. In the manufacture of electrical heating resistances, the process, which consists in compounding a salt of a conductive metal with a finely-divided refractory non-conductive material having the property of becoming fritted, slagged, or more or less vitrified, forming a plastic body therewith, reducing the aforesaid salt to a metallic state in an atmosphere of hydrogen, and then subjecting the body to a temperature sufficiently high to frit, slag or more or less vitrify the non-conductive material, for the purpose set forth.

4. As an article of manufacture, an electrical resistance consisting of a fritted, slagged or more or less vitrified non-conductor and a conductive metal disseminated throughout the same, substantially as set forth.

In testimony whereof I have hereunto set my hand in presence of two subscribing witnesses.

ADOLF VOGT.

Witnesses:
EDWARD GARDNER,
WALTER J. SKERTEN.